United States Patent
Muramatsu et al.

(10) Patent No.: US 7,483,690 B2
(45) Date of Patent: Jan. 27, 2009

(54) COMMUNICATION TERMINAL HAVING A FUNCTION TO INHIBIT CONNECTION TO A PARTICULAR SITE AND PROGRAM THEREOF

(75) Inventors: Naoki Muramatsu, Chiba (JP); Tetsuya Yamashita, Tokyo (JP); Masaaki Yamamoto, Yokohama (JP); Kazuhiro Yamada, Yokohama (JP); Satoshi Washio, Tokyo (JP); Toshiyasu Yabe, Yokohama (JP); Keiko Hirayama, Tokyo (JP); Bunga Chin, Kawasaki (JP); Kuniko Onozuka, Yokohama (JP); Mikihiro Sugino, Hachiouji (JP); Jiro Nakazaki, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 10/525,099

(22) PCT Filed: Aug. 19, 2003

(86) PCT No.: PCT/JP03/10433

§ 371 (c)(1),
(2), (4) Date: Feb. 6, 2006

(87) PCT Pub. No.: WO2004/017608

PCT Pub. Date: Feb. 26, 2004

(65) Prior Publication Data

US 2006/0155803 A1 Jul. 13, 2006

(30) Foreign Application Priority Data

Aug. 19, 2002 (JP) ............................. 2002-238347

(51) Int. Cl.
*H04M 3/16* (2006.01)

(52) U.S. Cl. .................. 455/410; 455/432.3; 455/411; 455/435.1; 455/414.1; 713/168; 713/166

(58) Field of Classification Search ................ 455/411, 455/412.1, 410, 432.3, 435.1
See application file for complete search history.

(56) References Cited

U.S. PATENT DOCUMENTS 6,049,821 A * 4/2000 Theriault et al. ............ 709/203
(Continued)

FOREIGN PATENT DOCUMENTS

JP 2001-022597 1/2001
(Continued)

OTHER PUBLICATIONS

NTT DoCoMo, Inc., "i-appli Content Developer's Guide for 504i," Functional Descriptions, Release 1.0, May 10, 2002© 2000-2002 NTT DoCoMo, Inc., and Sun Microsystems, Inc.

(Continued)

*Primary Examiner*—Charles N Appiah
*Assistant Examiner*—Kwasi Karikari
(74) *Attorney, Agent, or Firm*—Brinks Hofer Gilson & Lione (57) ABSTRACT

A mobile phone stores a plurality of profile data, each including a portal URL. A user of the mobile phone selects for use data of a profile including the portal URL. When a Java-AP running on the mobile phone transmits to JAM an instruction for a communication, JAM stores the domain name of the portal URL included in the selected profile data as information about the inhibited destination of a communication performed by the Java-AP. JAM restricts communications performed by a Java-AP on the basis of the information about the inhibited destination stored by JAM.

Thus, communications from a Java-AP running on the mobile phone to the server apparatus assigned with the domain name of the portal URL may be inhibited by selection of profile data including a portal URL.

14 Claims, 9 Drawing Sheets

U.S. PATENT DOCUMENTS

| | | | |
|---|---|---|---|
| 6,233,618 B1 * | 5/2001 | Shannon | 709/229 |
| 6,978,129 B1 * | 12/2005 | Peon et al. | 455/419 |
| 7,289,244 B2 * | 10/2007 | Tuli | 358/1.9 |
| 2003/0028532 A1 * | 2/2003 | Dongu et al. | 707/9 |
| 2003/0101264 A1 * | 5/2003 | Yamada et al. | 709/225 |
| 2003/0112182 A1 * | 6/2003 | Bajikar | 342/457 |
| 2003/0163731 A1 * | 8/2003 | Wigley et al. | 713/201 |

FOREIGN PATENT DOCUMENTS

| | | | |
|---|---|---|---|
| JP | 2002-041170 A | 2/2002 | |
| JP | 2002-157554 | 5/2002 | |
| JP | 2002-189646 | 7/2002 | |
| JP | 2003-332978 A | 11/2003 | |
| WO | WO 02/42920 A1 | 5/2002 | |

OTHER PUBLICATIONS

Kawai Yasuhiro, "Prevent Unauthorized Access by Individual PCs", Nikkei Internet Technology, Japan, Nikkei Business Publications, Inc., Jun. 22, 2006, No. 36, pp. 14-16, untranslated, and Concise Explanation of Relevance in English (1 pg.).

Fujisoft ABC Inc., Intranet/Internet Q&A for SOHO users (4), TRY!PC, vol. 11, No. 7, pp. 59-61, Japan, CQ Publishing Co., Ltd., Dec. 1, 1999, and Concise Explanation of Relevance (1 pg.);.

Japanese Office Action for Application No. 2004-528897, dated Aug. 21, 2007 (with full translation).

Japanese Office Action for Application No. 2004-528897, dated Jan. 15, 2007 (with full translation).

Chinese Office Action for Application No. 038196093, dated Aug. 15, 2008 (with full translation).

* cited by examiner

| ACCESS POINT ID |
|---|
| portal.aaa.ne.jp |
| portal.bbb.ne.jp |

| USER'S NAME | USER ID | EMAIL ADDRESS |
|---|---|---|
| Yamada, Taro | MS0001 | aaa@aaa.ne.jp |
| Yamada, Hanako | MS0002 | bbb@aaa.ne.jp |
| ⋮ | ⋮ | ⋮ |

| PROFILE NUMBER | ACCESS POINT ID | GATEWAY SERVER APPARATUS IP ADDRESS | PORTAL URL |
|---|---|---|---|
| 1 | portal.aaa.ne.jp | xxx.xxx.xxx.xxx | http://aaa.ne.jp/main.html |
| 2 | portal.aaa.ne.jp | yyy.yyy.yyy.yyy | http://ccc.ne.jp/main.html |
| 3 | portal.bbb.ne.jp | zzz.zzz.zzz.zzz | http://bbb.ne.jp/main.html |

```
********************
     PROFILE SELECTION
********************
LIST OF PROFILES
```

| PROFILE NUMBER | PORTAL URL |
|---|---|
| 1 | http://www.aaa.ne.jp/main.html |
| 2 | http://www.ccc.ne.jp/main.html |
| 3 | http://www.bbb.ne.jp/main.html |

PROFILE NUMBER OF PROFILE TO BE SELECTED

BX10 — [ 1 ]

[ REGISTER ]   [ CANCEL ]

COMMUNICATION TERMINAL HAVING A FUNCTION TO INHIBIT CONNECTION TO A PARTICULAR SITE AND PROGRAM THEREOF

TECHNICAL FIELD

The present invention relates to a technique of inhibiting communication by an application program running on a communication terminal with a particular site.

RELATED ART

Currently, many mobile phones are able to run Java application programs. A Java application program is written in Java™ program language, and will be referred as Java-AP, below.

Some Java-APs enable a mobile phone to connect and communicate with a server apparatus via the Internet.

A Java-AP which is able to communicate unrestrictedly with a server apparatus may be programmed with a malicious function to communicate with a server apparatus without the knowledge of a user of the mobile phone executing the Java-AP. As a result, the user of the mobile phone may suffer some damages or the mobile phone may be caused to malfunction.

Some server apparatuses, especially a server apparatus of a portal site managed by an operator providing a mobile phone with an ability to connect to the Internet, stores information on a user of a mobile phone who uses the portal site, together with information on an information provider providing a service via the portal site. Thus, a high level of security is desirable for such servers.

If a Java-AP programmed with a malicious intention is able to communicate with a server apparatus of a portal site, data on the portal site may be changed or read illegally. Thus the portal site may suffer significant damage.

A mobile phone which conforms to the guidelines laid out in a document titled 'i-Appli Contents Development Guide for 504i—Detailed Version—Rev. 1.0' restricts a Java-AP download from a server apparatus to communicate only with the server apparatus from which the Java-AP was downloaded, so as to solve the above problems.

However, it is preferable that, when taking into account the significance of data stored in a portal site, connections from a Java-AP to server apparatuses of portal sites are inhibited, in addition to the above communication restriction.

Further, even in a case that a user of a mobile phone chooses to use one of a plurality of portal sites, it is preferable that a connection from a Java-AP running in the mobile phone to the newly selected portal site is inhibited.

BRIEF SUMMARY

The present invention provides a communication terminal, including means for communicating with a server apparatus; means for storing one or a plurality of server apparatus IDs, each of the server apparatus IDs uniquely identifying a server apparatus of a destination; means for specifying a server apparatus of a destination by selecting a server apparatus ID from the one or plurality of server apparatus IDs stored in the storing means; and an execution environment, in which an application is executable, wherein if an application running in the execution environment makes a request to connect to a server apparatus specified by the specifying means, the execution environment declines the request from the application. The storing means may store a server apparatus ID of a destination and communication path information including a routing path ID, the routing path ID identifying a routing path from the communication terminal itself to a server apparatus of a destination specified by the server apparatus ID, and the specifying means may specify the server apparatus by selecting the communication path information. The communication terminal may further include means for extracting, from the storing means, path information including the same routing path ID as that included in the routing path information selected by the specifying means, wherein the execution environment declines a request from the application to connect to the server apparatus identified by the server apparatus ID, the server apparatus ID being included in the path information extracted by the extracting means.

The present invention provides a computer program for causing a computer to execute: a process of communicating; a process of reading a server apparatus ID from storing means storing one or a plurality of server apparatus IDs, each of the server apparatus IDs uniquely identifying a server apparatus; a process of generating a list of destinations to which communication is inhibited, on the basis of the server apparatus ID read in the reading process; a process of executing an application; a process of determining, on receiving a request to communicate with a destination from the application executed in the executing process, whether the destination is included in the list of inhibited destinations; and a process of declining the request to communicate with a destination if the destination is included in the list of inhibited destinations, and of connecting to a destination by using a communication function in the case that the destination is not included in the list.

DETAILED DESCRIPTION OF THE PREFERRED EMBODIMENTS

Details of an embodiment of the present invention will be described below with reference to the attached drawings.

A. Configuration

A-1. Configurations of Communication System 10, in which a Mobile Phone is Used.

Figure 1:
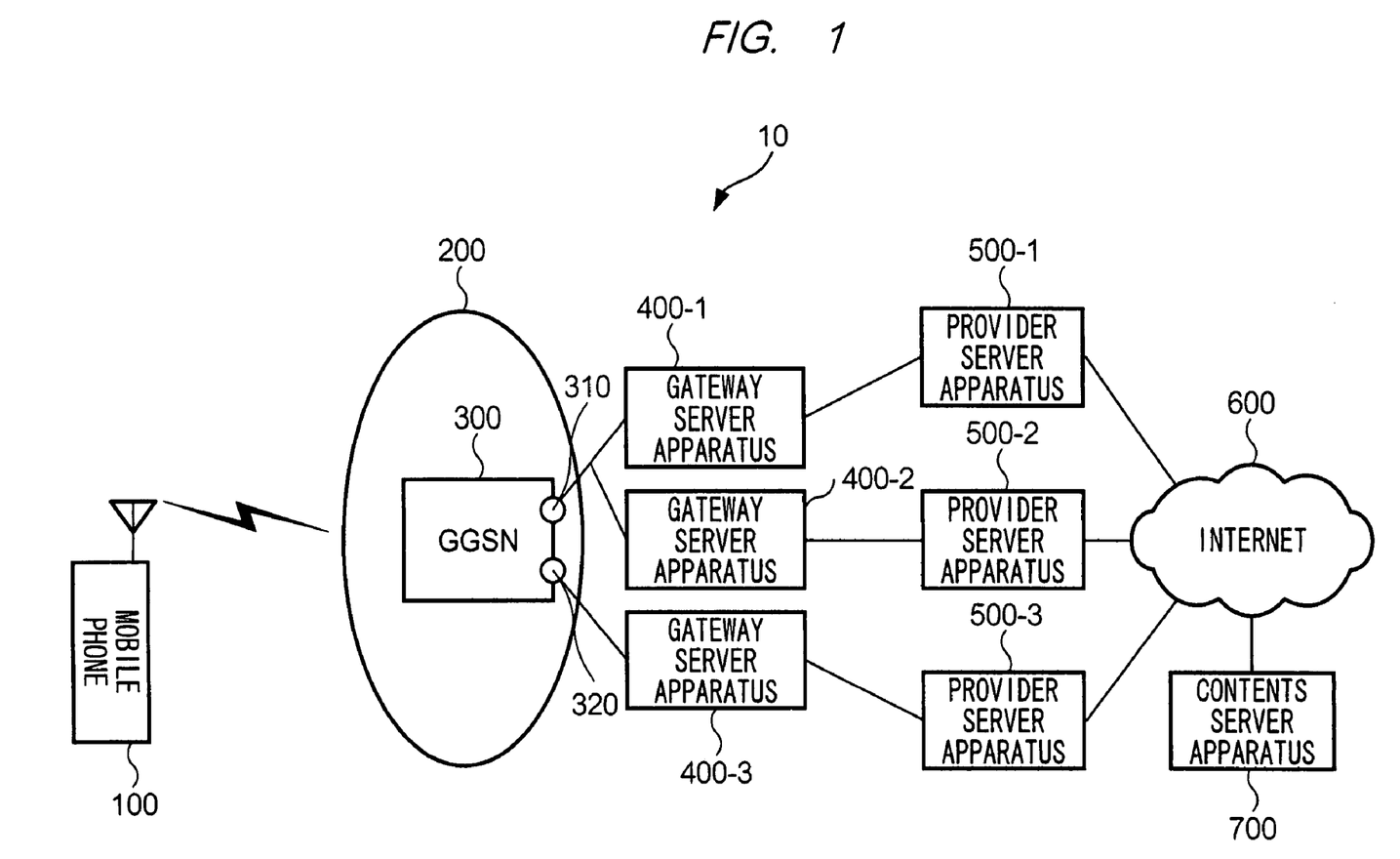
FIG. 1 is a block diagram illustrating an entire configuration of a communication system according to an embodiment of the present invention.

FIG. 1 is a block diagram illustrating a configuration of a communication system 10 in which mobile phone 100 is used, according to an embodiment of the present invention.

Communication system 10 includes a mobile communication network 200, a plurality of gateway server apparatuses GWS 400 (400-1, 400-2, 400-3, . . . ), a plurality of a provider's server apparatuses PVS 500 (500-1, 500-2, 500-3, . . . ), Internet 600, and a plurality of contents server apparatuses CTS 700. In FIG. 1, for simplicity, only three gateway server apparatuses GWS 400-1, 400-2, 400-3, three provider's server apparatuses PVS 500-1, 500-2, 500-3, and a contents server apparatus CTS 700 are illustrated.

Mobile communication network 200 is, for example, configured as a GSM/GPRS network (Global System for Mobile communications/General packet Radio Service network) providing a mobile phone with a data communication service. Details of the GSM/GPRS network will be described below.

Mobile communication network 200 includes a wireless base station, a base station controlling station, a Serving GPRS Support Node (SGSN), and a Gateway GPRS Support Node (GGSN) 300. In FIG. 1, for simplicity, only a GGSN 300 is illustrated.

GGSN 300 is a switch disposed on an inter-connecting node between a GSM/GPRS network and other communication networks. According to the present embodiment, GGSN 300 includes a first access point 310 and a second access point 320, each for communicating with other communication networks. An access point ID is assigned to each access point.

GGSN 300 has an access point table TB1. According to the present embodiment, shown in FIG. 2, access point table TB1 stores in its first line an access point ID 'portal.aaa.ne.jp' for specifying first access point 310, and stores in its second line an access point ID 'portal.bbb.ne.jp' for specifying second access point 320.

Figure 2:
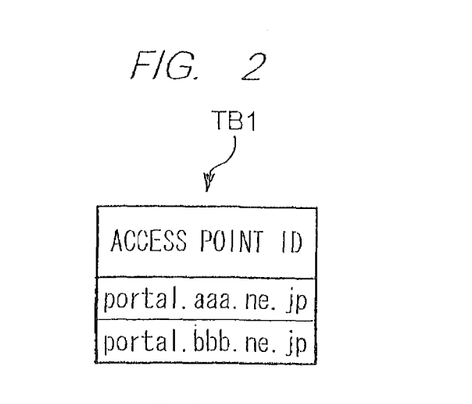
FIG. 2 is a drawing illustrating details of an access point table of GGSN 300 according to the same embodiment.

On receiving a packet from mobile phone 100 via each node in the mobile communication network, GGSN 300 extracts an access point ID from the header of the received packet, refers to access point table TB1 on the basis of the extracted access point ID, and transmits (routes) the received packet to either one of a first access point or a second access point.

Gateway server apparatus GWS 400 connects to the GSM/GPRS network via an access point in GGSN 300, connects to Internet 600 via provider's server apparatus PVS 500, and converts different communication protocols between the GSM/GPRS network and the Internet 600. To distribute process loads in provider's server apparatus PVS 500 or for other reasons, provider's server apparatus PVS 500 may be connected to an access point in GGSN 300 via a gateway server apparatus GWS 400. According to the present embodiment, the provider's server apparatus PVS 500-1 is connected to first access point 310 via gateway server apparatus GWS 400-1 and the provider's server apparatus PVS 500-2 is connected gateway server apparatus GWS 400-2. Provider's server apparatus PVS 500-3 is connected to second access point 320 via gateway server apparatus GWS 400-3.

An Internet Protocol (IP) address is assigned to gateway server apparatus GWS 400. According to the present embodiment, an IP address 'xxx.xxx.xxx.xxx' is assigned to gateway server apparatus GWS 400-1, an IP address 'yyy.yyy.yyy.yyy' is assigned to gateway server apparatus GWS 400-2, an IP address 'zzz.zzz.zzz.zzz' is assigned to gateway server apparatus GWS 400-3.

Provider's server apparatuses PVS 500 are operated by one or a plurality of enterprises providing access service from mobile phone 100 to Internet 600. Each provider's server apparatus PVS 500 is connected to gateway server apparatus GWS 400 and Internet 600. A domain name is assigned to provider's server apparatus PVS 500. According to the present embodiment, a domain name 'aaa.ne.jp' is assigned to provider's server apparatus PVS 500-1, a domain name 'ccc.ne.jp' is assigned to provider's server apparatus PVS 500-2, and a domain name 'bbb.ne.jp' is assigned to provider's server apparatus PVS 500-3. Provider's server apparatus PVS 500 has proxy and firewall functions similar to those of a usual proxy server apparatus, an email server function similar to that of a usual email server apparatus, and WWW server and portal functions similar to those of a usual World Wide Web (WWW) server apparatus.

Provider's server apparatus PVS 500 performs its proxy function to enable mobile phone 100 to access the Internet 600 and to relay a received HTTP request to other providers' server apparatuses PVS 500.

Provider's server apparatus PVS 500 performs its firewall function to restrict access to its managing files or the like, including Hyper Text Transfer Protocol (HTTP) requests from the Internet 600.

Provider's server apparatus PVS 500 performs its email server function to transmit and receive emails from and to mobile phone 100 used by a user who is registered with an operator operating provider's server apparatus PVS 500.

Figure 3:
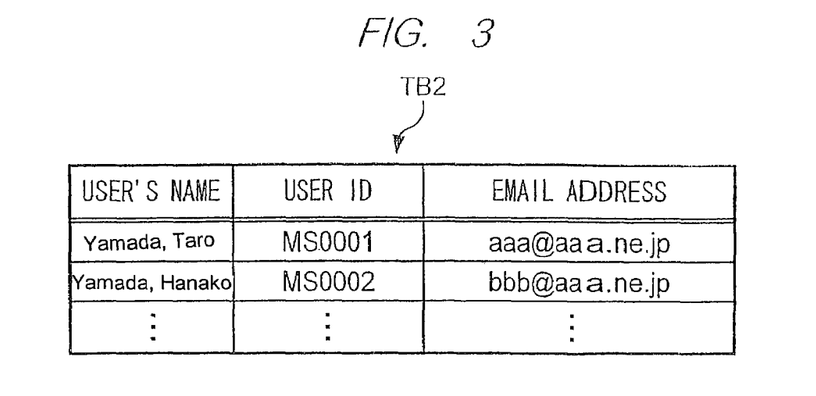
FIG. 3 is a drawing illustrating details of a user table of a provider's server apparatus according to the same embodiment.

Provider's server apparatus PVS 500 has a user table TB2 storing user information of each user using the email service. According to the present embodiment, shown in FIG. 3, user table TB2 stores a user's name, a user ID assigned to the user, and user information including the user's email address.

Provider's server apparatus PVS 500 performs its web server function to transmit a text file stored in provider's server apparatus PVS 500 to a mobile phone 100, on receiving from the mobile phone 100 an HTTP request specified with a Uniform Resource Locator (URL). The text file is written in conformity with HyperText Markup Language (HTML) language, and will be referred as 'HTML file'.

Figure 11:
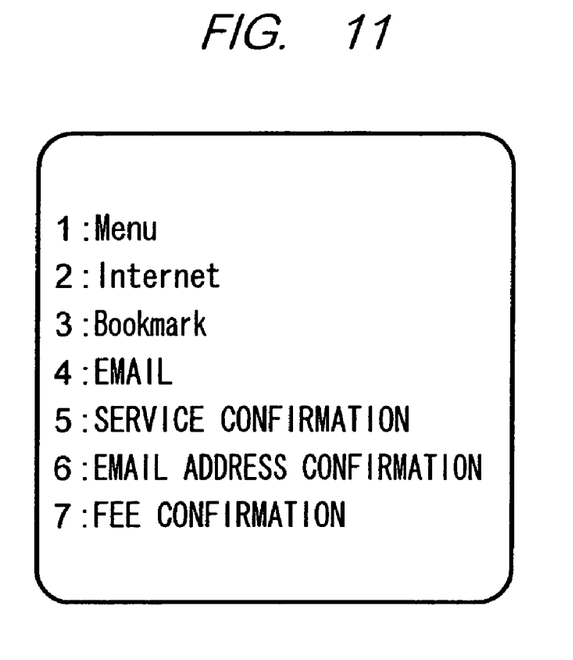
FIG. 11 is a drawing illustrating a portal screen displayed on a display unit of a mobile phone according to the same embodiment.

Provider's server apparatus PVS 500 stores a file, namely a first HTML file, so as to function as a portal site in setting up a connection from mobile phone 100 to Internet 600. The first HTML file is requested in HTTP-protocol by mobile phone 100 first, and has a file name 'main.html', for example. The HTML file 'main.html' includes a URL indicating a storage location of an HTML file as link information of the file; for example, a URL 'http://aaa.ne.jp/mail#ad.html' indicating a storage location of a HTML file 'mail#ad.html' for displaying an email address confirmation screen, in case of provider's server apparatus PVS 500-1. On receiving the file 'main.html', mobile phone 100 displays on its display unit 105 a portal screen as illustrated in FIG. 11, for example.

Later the URL indicating the storing location of the file 'main.html' stored in the provider's server apparatus PVS 500 will be referred as a portal URL of the provider's server apparatus PVS 500, for the sake of convenience.

According to the present embodiment, the portal URLs of provider's server apparatuses PVS 500-1, PVS 500-2, PVS 500-3 are set as 'http://aaa.ne.jp/main.html', 'http://ccc.ne.jp/main.html', 'http://bbb.ne.jp/main.html', respectively.

Contents server apparatus CTS 700 has a Web server function similar to that of a usual Web server apparatus. On receiving from mobile phone 100 an HTTP request including a URL, contents server apparatus CTS 70 is able to transmit to the mobile phone 100 a specified one of the Java-APs stored in the contents server apparatus CTS 70 itself.

A-2. Configuration of a Mobile Phone

A-2-1. Entire Configuration

Figure 4:
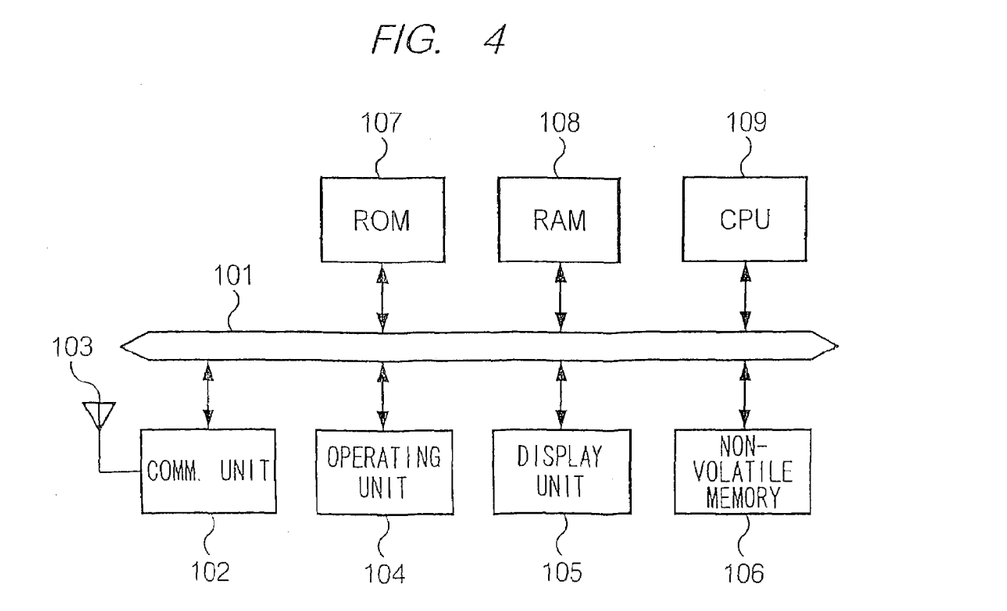
FIG. 4 is a block diagram illustrating a configuration of a mobile phone according to another embodiment of the present invention.

FIG. 4 is a block diagram illustrating a configuration of mobile phone 100 according to the present embodiment. As shown in FIG. 4, mobile phone 100 has bus 101, communication unit 102, antenna 103, operating unit 104, display unit 105, non-volatile memory 106, Read Only Memory (ROM) 107, Random Access Memory (RAM) 108, and Central Processing Unit (CPU) 109.

As shown in FIG. 4, bus 101 connects these components, to allow exchange of data between them. Communication unit 102 is connected to antenna 103. Communication unit 102 performs via antenna 103 a communication such as a packet communication with a wireless base station of a mobile communication network. Operating unit 104 has key inputting means such as a numeric keypad. Display unit 105 is able to display characters and menu screens, and is configured as a liquid crystal display, for example.

Non-volatile memory 106 stores a management code 'MS 0001' assigned to a user of the mobile phone 100. Non-volatile memory 106 also stores a JAR storage for storing a Java-AP, a Scratchpad, and a profile table TB3 storing profile data. ROM 107 stores an initialize software program, application program execution environment software program, WWW browsing software program (this will be referred as 'browser', or 'Web browser'), a phonebook application program, and the like. RAM 108 is used as a working area.

CPU 109 controls each components of mobile phone 100.

A-2-2. Configuration of Application Program Execution Environment Software

Figure 5:
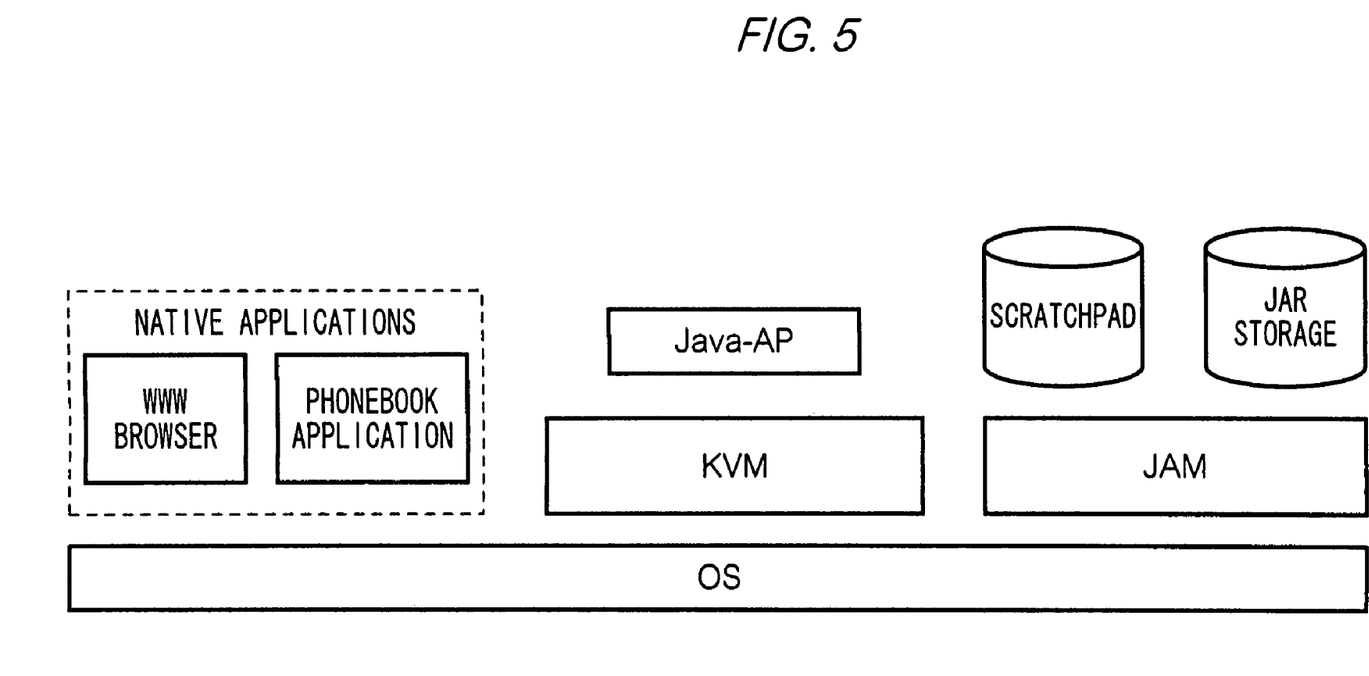
FIG. 5 is a drawing illustrating a configuration of the application execution environment software implemented in a mobile phone according to the same embodiment.

FIG. 5 is a drawing illustrating a configuration of application program execution environment software implemented on mobile phone 100 according to the present embodiment. Application programs include application programs written in the native code of a CPU (these will be referred to as 'native application programs') and a Java-AP (Java Application) program running in a Java execution environment. In mobile phone 100 shown in FIG. 5 of the present embodiment, the Web browsing software and the phonebook application are implemented as native applications.

Application program execution environment software controls each component of mobile phone 100, and includes OS software providing an interface for executing native application programs, and a Java execution environment including a K Virtual Machine (KVM), a Java Application Manager (JAM), a Java ARchive (JAR) storage, and a Scratchpad storage.

KVM is an implementation of a Java Virtual Machine which converts Java bytecodes into native codes and executes the native codes. KVM is suitable for a small apparatus which has a limited storage capacity, a limited CPU performance, and limited power consumption.

JAM manages a Java-AP running in the above-described Java execution environment. Specifically, JAM allocates in non-volatile memory 106 a JAR storage for storing Java-APs; allocates for each Java-AP a scratchpad storage, which retains data even after termination of each Java-AP, in non-volatile memory 106; installs (stores) a Java-AP in JAR storage; deletes a Java-AP stored in the JAR storage; lists Java-APs stored in the JAR storage; launches a Java-AP stored in the JAR storage; and terminates a running Java-AP unconditionally.

JAM manages communications from and to a running Java-AP. Specifically, on receiving from a running Java-AP an instruction to transmit an HTTP request generated by the Java-AP, JAM is able to transmit the HTTP request. Details of the operation of JAM for managing communications will be described below.

A-2-3. Configuration of Profile Data and Profile Table

Figure 6:
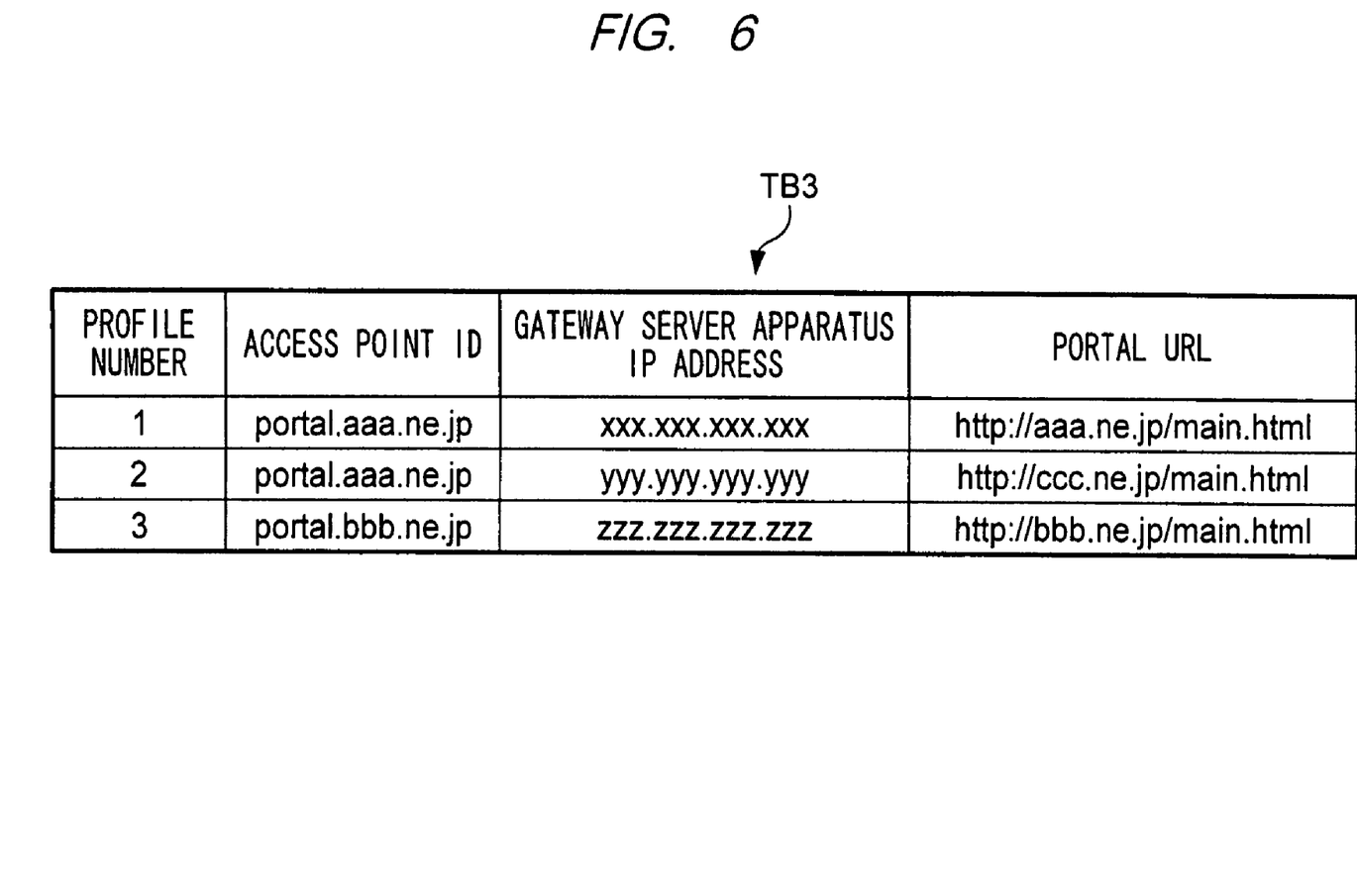
FIG. 6 is a drawing illustrating details of a profile table stored in a mobile phone according to the same embodiment.

Profile table TB3 stores profile data including information for specifying a communication route connecting mobile phone 100 and provider's server apparatus PVS 500. In the present embodiment, data of one profile is selected from among profile data stored in profile table TB3 by a user of mobile phone 100.

In a case of communicating with provider's server apparatus PVS 50, a native application (a Java-AP) running in mobile phone 100 sets up a connection to provider's server apparatus PVS 500 by using the selected profile data.

As shown in FIG. 6, the profile data stored in profile table TB3 includes a profile number, an access point ID, a gateway server apparatus IP address (this will be referred as 'GWIP'), and a portal URL. The profile number identifies data of each profile. The access point ID is the access point ID of the access point in GGSN 300 used in each connection. The GWIP is the IP address of the gateway server apparatus in GWS 400 in each connection. The portal URL is the portal URL of destination of the provider's server apparatus PVS 500.

Later, the profile data having profile data '1', the profile data having profile number '2', and the profile data having profile data '3' will be referred as 'profile data 1', 'profile data 2', and 'profile data 3', respectively.

B. Operations

B-1. Operations in Communication System 10 (a Mobile Phone is Used in the Communication System)

B-1-1. Routing and Setting up a Connection

Mobile phone 100A transmits a packet requesting a connection. The packet is transmitted to GGSN 300 via a wireless base station(s), a base station controlling station(s), and an SGSN(s), these nodes constitute a mobile communication network 200.

Details of the present embodiment are described for a case that profile data 1 is selected on mobile phone 100 and that mobile phone 100 transmits a packet requesting a connection, the packet including an access point ID 'portal.aaa.ne.jp', a GWIP 'xxx.xxx.xxx.xxx', an IP address 'xxx.xxx.xxx.xxx', and a domain name 'aaa.ne.jp'.

On receiving the packet requesting a connection, GGSN 300 extracts the access point ID included in the received packet. GGSN 300 queries access point table TB1 by using the extracted access point ID, and determines the access point which has transmitted the packet. After determination of the access point, GGSN 300 performs a routing operation by transmitting to the gateway server apparatus(es) GWS 400 connected to the determined access point the received packet.

In the present embodiment, the access point ID 'portal.aaa.ne.jp' is extracted from the received packet. The access point ID is stored in a first record of access point table TB1 as illustrated in FIG. 2, the first record indicating the first access point 310. Thus, GGSN 300 transmits the received packet requesting a connection to gateway server apparatuses GWS 400-1 and GWS 400-2, which are connected to first access point 310.

On receiving the packet, gateway server apparatus GWS 400-1 and GWS 400-2, respectively, extract the GWIP included in the received packet, and compare the extracted GWIP and the IP address assigned to each of the gateway server apparatus GWS 400-1 and GWS 400-2.

In the present embodiment, the GWIP 'xxx.xxx.xxx.xxx' is extracted from the received packet. The GWIP corresponds to the IP address 'xxx.xxx.xxx.xxx' assigned to gateway server apparatus GWS 400-1. On the contrary, the GWIP does not correspond to the IP address 'yyy.yyy.yyy.yyy' assigned to gateway server apparatus GWS 400-2. Thus, only gateway server apparatus GWS 400-1 transmits the packet requesting a connection to provider's server apparatus PVS 500-1 connected to gateway server apparatus GWS 400-1.

On receiving the packet, provider's server apparatus PVS 500-1 extracts the domain name included in the received packet, and compares the extracted domain name and the domain name assigned to the provider's server apparatus PVS 500-1. In the present embodiment, the domain name 'aaa.ne.jp' is extracted from the received packet. The domain name 'aaa.ne.jp' corresponds to the domain name 'aaa.ne.jp' assigned to provider's server apparatus PVS 500-1. Thus, provider's server apparatus PVS 500-1 transmits an acknowledge packet in response to the packet requesting a connection to the mobile phone 100. Then, provider's server apparatus PVS 500-1 generates a packet requesting an establishment of a connection, and transmits to the mobile phone 100 the packet in the reversal path.

When provider's server apparatus PVS 500-1 receives from the mobile phone 100 an acknowledge packet for the packet requesting an establishment, a connection between the mobile phone 100 and the provider's server apparatus PVS 500-1 is established.

B-1-2. Portal Operation of Provider's Server Apparatus PVS 500

On receiving from mobile phone 100 an HTTP request including a URL 'http://aaa.ne.jp/main.html', provider's server apparatus PVS 500-1 reads a file 'main.html' specified by the URL included in the received HTTP request, generates an HTTP response message including the file (the HTTP response will be referred to as an HTTP response, below), and transmits the HTTP response to mobile phone 100. On receiving the HTTP response, mobile phone 100 displays the portal screen shown in FIG. 11 on its display unit 105.

On receiving the HTTP request including a URL 'http://aaa.ne.jp/mail#ad.html' and a management index 'MS0001', provider's server apparatus PVS 500-1 reads a file specified by the URL included in the received HTTP request.

Then, provider's server apparatus PVS 500-1 extracts a management index 'MS0001' included in the HTTP request, queries user table TB2 to obtain user information having the same management index as the extracted management index 'MS0001', and reads from user table TB2 the email address 'aaa@aaa.ne.jp' included in the queried user information.

Figure 12:
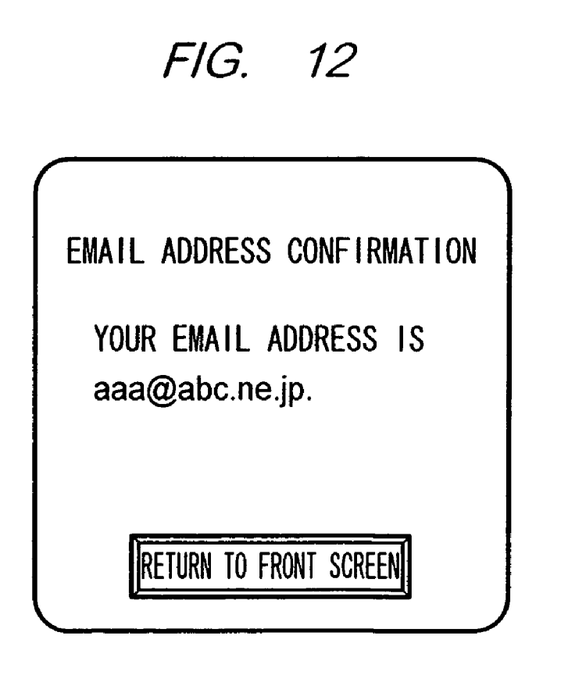
FIG. 12 is a drawing illustrating an email confirmation screen displayed on a display unit of a mobile phone according to the same embodiment.

Provider's server apparatus PVS 500-1 generates an HTTP response including an HTML file, for example, for displaying the read email address as illustrated in FIG. 12, and transmits the generated HTTP response to mobile phone 100. On receiving the HTTP response, mobile phone 100 displays the email address confirmation screen illustrated in FIG. 12 on its display unit 105.

B-2. Operations of Mobile Phone 100

B-2-1. Initial Operation, Profile Selecting Operation, and Application Executing Operation Details of an initial operation, a profile selecting operation, and an application executing operation of mobile phone 100 according to the present embodiment will be described.

When mobile phone 100 is switched on, CPU 109 reads and executes the initializing software stored in ROM 107, so as to initialize each component of mobile phone 100. After the initialization, CPU 109 reads and executes the OS software stored in ROM 107. After executing the OS software, CPU 109 reads and executes the Java execution environment software, namely KVM and JAM, stored in ROM 107, so as to prepare an execution environment for executing a Java-AP.

Then CPU 109 performs its operations in accordance with signals input to CPU 109. On detecting an input operation in operating unit 104, CPU 109 evaluates an instruction of a user of mobile phone 100 on the basis of a signal provided from operating unit 104 and a screen image displayed on display unit 105, and performs its operations in accordance with the instruction of the user.

For example, if a user of mobile phone 100 inputs an instruction in operating unit 104 to display a profile data selection screen, CPU 109 displays a list screen for selecting profile data on an LCD display of display unit 105.

Figure 7:
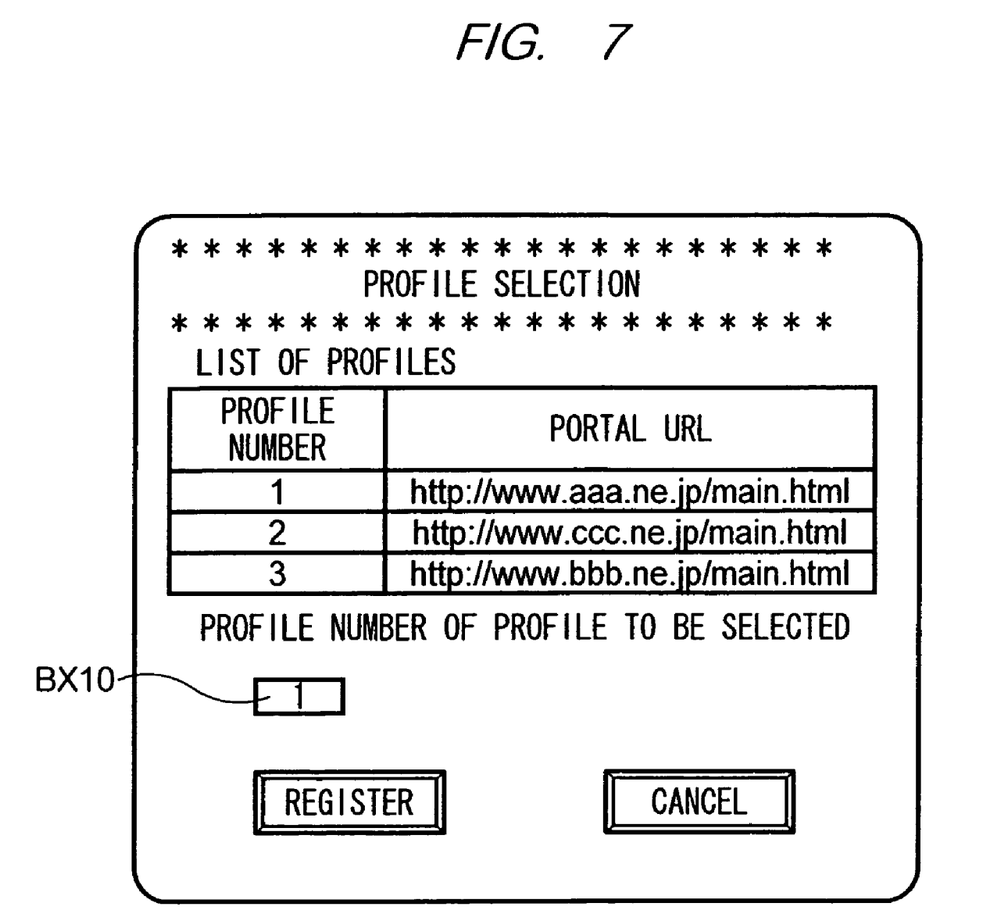
FIG. 7 is a drawing illustrating a profile data selection screen displayed on a display unit of a mobile phone according to the same embodiment.

In the present embodiment, CPU 109 displays profile numbers and portal URLs for all profile data stored in profile table TB3 in a tabular format, as illustrated in FIG. 7. CPU 109 also displays a text box BX10 for inputting a profile number of a profile to be selected, a registration button, and a cancel button on display unit 105.

When a user of mobile phone 100 inputs in text box BX10 a profile number, and clicks the registration button, CPU 109 determines the profile data having the profile number input in text box BX10, and advances its operations.

When a user of mobile phone 100 inputs an instruction in operating unit 104 to execute the Web browsing software configured as native software, CPU 109 reads and executes the Web browsing software stored in ROM 107 under the control of the running OS software.

When a user of mobile phone 100 inputs an instruction in operating unit 104 to execute a Java-AP downloaded and stored in non-volatile memory 106 of mobile phone 100, CPU 109 reads and executes the Java-AP from non-volatile memory 106 under the control of the running JAM.

B-2-2. Communication Performed by Native Application

Figure 8:
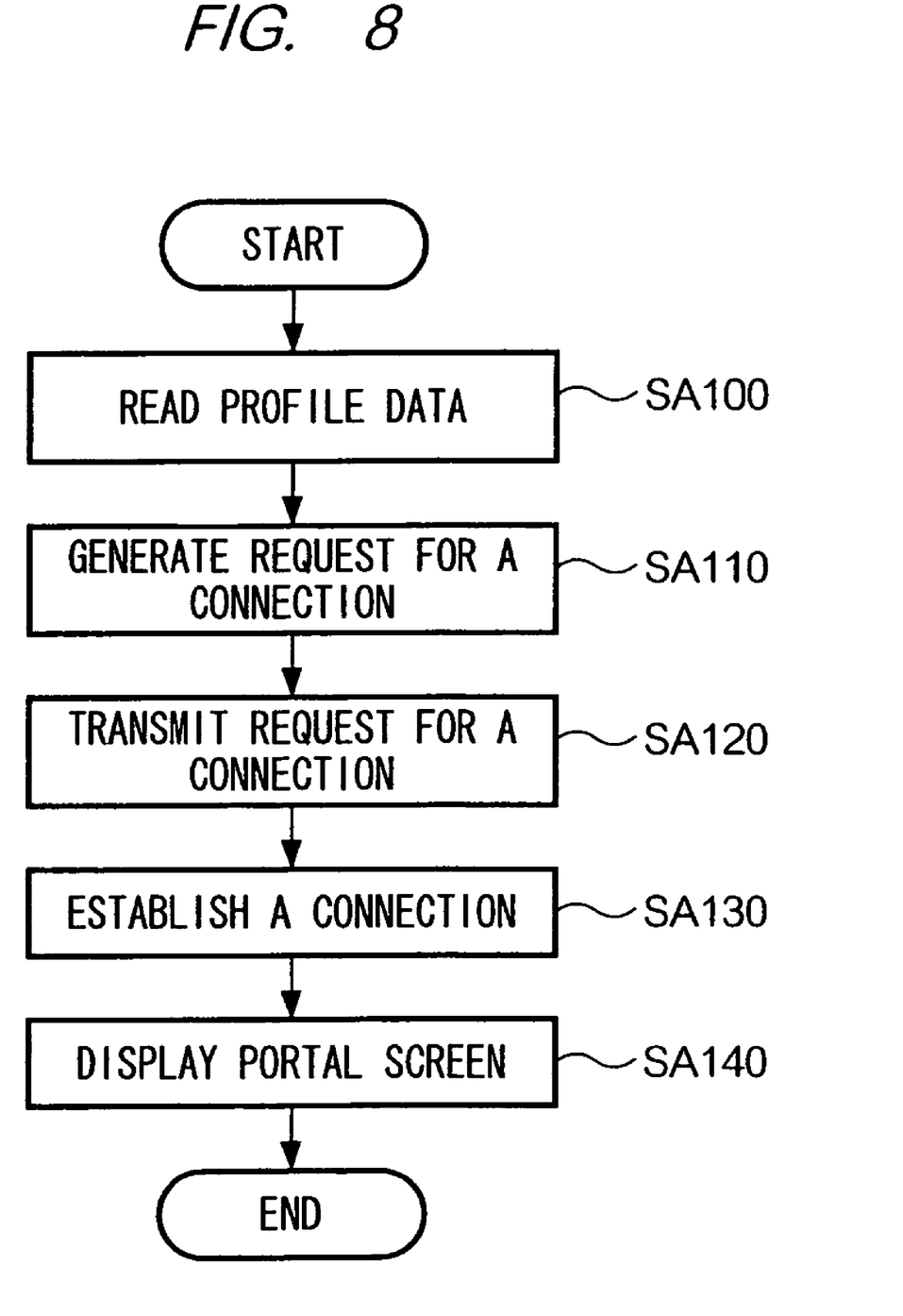
FIG. 8 is a flow chart illustrating operations of a Web browsing software application performed in a mobile phone according to the same embodiment: the Web browsing software establishing a connection in a communication with a provider's server apparatus, and displaying a portal screen.

FIG. 8 is a flowchart illustrating operations of Web browsing software performed in mobile phone 100 according to the present embodiment; the Web browsing software being configured as native software, establishing a connection in a communication with a provider's server apparatus PVS 500, and displaying a portal screen.

Details of the operations are described for a case that profile data 1 is selected. It is assumed that the Web browsing software has already been executed in accordance with the procedures described in section B-2-1.

The Web browsing software (on mobile phone 100) reads the selected profile data 1 from profile table TB3, and extracts the access point ID 'portal.aaa.ne.jp', the GWIP 'xxx.xxx.xxx.xxx', the portal URL 'http://aaa.ne.jp/main.html', and the domain name 'aaa.ne.jp' of the portal URL included in the read profile data 1 (Step SA100).

The Web browsing software generates a packet requesting a connection including the extracted access point ID, the extracted GWIP, and the extracted domain name (Step SA110). Then the Web browsing software transmits the packet to provider's server apparatus PVS 500-1 assigned to the extracted domain name 'aaa.ne.jp' through a packet communication via a wireless base station of a mobile communication network (Step SA120).

On receiving from provider's server apparatus PVS 500-1 an acknowledge packet and a packet requesting an establishment of a connection corresponding to the packet requesting a connection, the Web browsing software generates an acknowledge packet corresponding to the packet requesting an establishment, and transmits the packet to the provider's server apparatus PVS 500-1.

When the provider's server apparatus PVS 500-1 receives an acknowledge packet corresponding to the packet requesting an establishment, the connection between the Web browsing software and the provider's server apparatus PVS 500-1 is established (Step SA130).

Then, the Web browsing software generates an HTTP request including a GET method having the extracted portal URL as a parameter, and transmits the generated HTTP request to the provider's server apparatus PVS 500-1 through the established connection. On receiving from provider's server apparatus PVS 500-1 the HTTP response, the Web browsing software disconnects the connection, and extracts and obtains from the received HTTP response a file 'main.html'. Then, the Web browsing software evaluates the obtained file, and displays a portal screen on the LCD display of display unit 105 as illustrated in FIG. 11, for example (Step SA140).

When a user of mobile phone 100 selects, for example, a key '6' in the numeric pad of operating unit 104 to instruct '6:email address confirmation', the Web browsing software extracts the URL 'http://aaa.ne.jp/mail#ad.html' and a link to the '6:email address confirmation' on the portal screen.

The Web browsing software establishes a connection with provider's server apparatus PVS 500-1 in a similar manner to Steps SA110 to SA130 in FIG. 8. The Web browsing software generates an HTTP request including a GET method having the extracted URL and the management index 'MS0001' stored in non-volatile memory 106 of mobile phone 100, and transmits the generated HTTP request to provider's server apparatus PVS 500-1.

On receiving from the provider's server apparatus PVS 500-1 an HTTP response, the Web browsing software terminates the connection, extracts from the received HTTP response an HTML file, evaluates the extracted file, and displays an email address confirmation screen on the LCD display of display unit 105 as illustrated in FIG. 12, for example.

B-2-3. Communication Performed by a Java-AP (1)

It is assumed here that a Java-AP has been already executed in a similar manner to the procedures described in the section B-2-1.

It is also assumed that a Java-AP tries to obtain from provider's server apparatus PVS 500-1 an email address assigned to a user of mobile phone 100 without obeying the instructions of the user of mobile phone 100. Specifically, the Java-AP generates an HTTP request including a GET method having a URL 'http://aaa.ne.jp/mail#ad.html' for confirming an email address and a management index assigned to the user of mobile phone 100, and instructs JAM to transmit the generated HTTP request.

Figure 9:
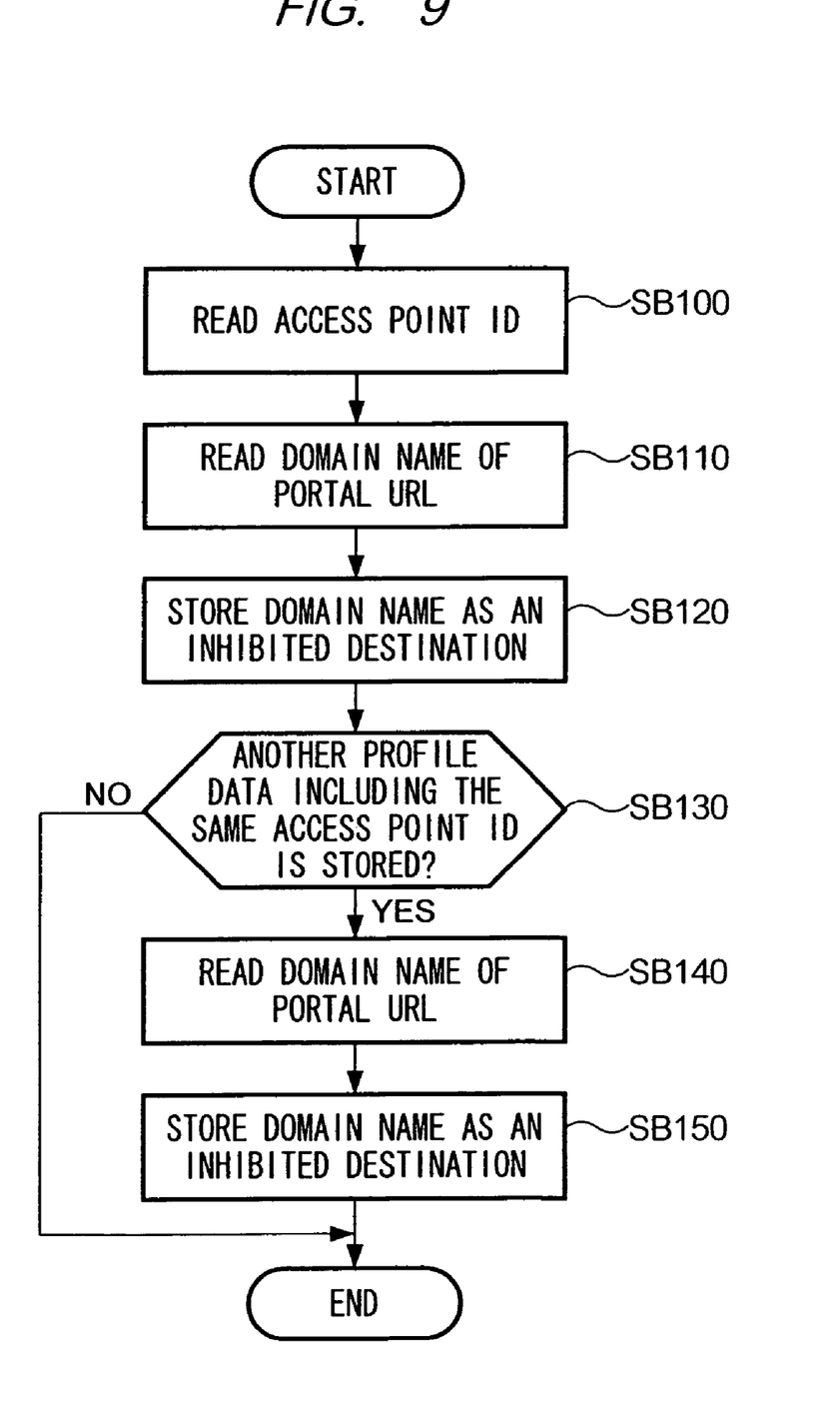
FIG. 9 is a flow chart illustrating operations of JAM running in a mobile phone according to the same embodiment, JAM storing a particular site with which communication is inhibited.
Figure 10:
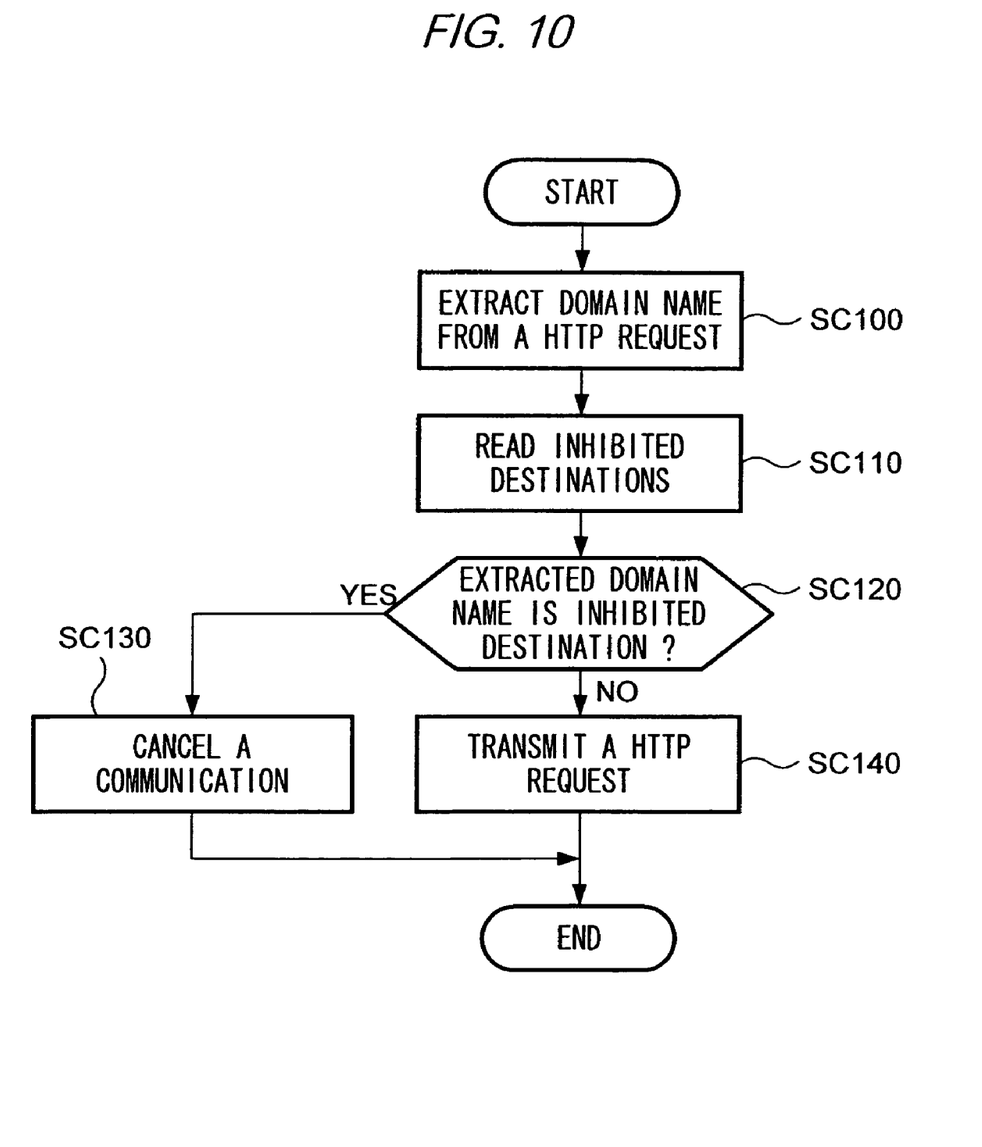
FIG. 10 is a flow chart illustrating the operations of JAM running in a mobile phone according to the same embodiment, JAM closing a connection with a particular site.

On receiving from the Java-AP a request for a communication, JAM generates in RAM 108 a domain name of a inhibited destination, as illustrated in FIG. 9. Then, JAM inhibits any communications with a server apparatus assigned the domain name of a inhibited destination, as illustrated in FIG. 10. Details of these operations will be described for a case that profile data 1 is selected.

FIG. 9 is a flow chart illustrating the operations of JAM generating in RAM 108 a domain name of a inhibited destination.

On receiving an instruction to transmit an HTTP request from a Java-AP, JAM reads from profile table TB3 an access point ID 'portal.aaa.ne.jp' of profile data 1 (Step SB100). JAM reads from profile table TB3 the domain name 'aaa.ne.jp' of portal URL of profile data 1 (Step SB110), and stores in RAM 108 the read domain name (Step SB120).

Then, JAM confirms whether profile data including the same access point ID as the read access point ID is stored in profile table TB3 (Step SB 130). In the present embodiment, the same access point ID as the read access point ID 'portal.aaa.ne.jp' is stored in profile data 2, as illustrated in FIG. 6 (Step SB130:YES). Thus, JAM reads the domain name 'ccc.je.jp' of a portal URL of profile data 2 from profile table TB3 (Step SB140), and stores in RAM 108 the read domain name (Step SB150). Thus, the domain names 'aaa.ne.jp' and 'ccc.ne.jp' are stored in RAM 108 as information on inhibited destinations.

FIG. 10 is a flow chart illustrating operations of JAM inhibiting communications with the server apparatus assigned with a domain name of a inhibited destination.

JAM extracts a domain name from a URL described as a parameter of a GET method (Step SC100). Then, JAM reads the domain name stored in RAM 108 (Step SC110). JAM determines whether the domain name extracted from the URL corresponds to the domain name read from RAM 108 (Step SC120). In the present embodiment, the domain name 'aaa.ne.jp' of the URL included in the HTTP request generated by the Java-AP corresponds to the domain name 'aaa.ne.jp' stored in RAM 108 as a inhibited destination (Step SC120:YES). Thus, JAM cancels transmitting the HTTP request to provider's server apparatus PVS 500-1 by declining an establishment of a connection from the Java-AP to provider's server apparatus PVS 500-1 (Step SC130). Accordingly, communications from Java-AP are inhibited on the basis of data (domain name) generated from the profile data.

The data is configured to be generated from a portal URL included in profile data when a Java-AP performs a communication. Accordingly, non-volatile memory 106 may be more effectively used than in the embodiment in which part of a storage region is preserved in non-volatile memory 106 for storing inhibited destinations performed by a Java-AP.

When profile data is selected, communications are inhibited with the portal site assigned with the domain name of a portal URL included in the profile data. Accordingly, personal information to be securely maintained, such as an email address stored in a portal site, may be protected from illegally changed or read by a Java-AP programmed with illegal intentions.

B-2-4. Communication performed by Java-AP (2)

Details will be described for a case that profile data 2 is selected.

Java-AP generates an HTTP request, and instructs JAM to transmit the generated HTTP request, in the same manner as described in the section 'Communication performed by Java-AP (1)'. Details of these operations will not be repeated here.

On receiving an instruction to transmit an HTTP request from a Java-AP, JAM reads from profile table TB3 an access point ID 'portal.aaa.ne.jp' of profile data 2 (FIG. 9:Step SB100). JAM then reads from profile table TB3 a domain name 'ccc.ne.jp' of a portal URL of profile data 2 (Step SB110), and stores in RAM 108 the read domain name (Step SB120).

Then, JAM confirms whether profile data including the same access point ID as the read access point ID is stored in profile table TB3 (Step SB130). In the present embodiment, the same access point ID as the read access point ID 'portal.aaa.ne.jp' is stored included in profile data 1 as illustrated in FIG. 6 (Step SB130:YES). Thus, JAM reads the domain name 'aaa.ne.jp' of a portal URL of profile data 1 from profile table TB3 (Step SB140), and stores in RAM 108 the read domain name (Step SB150). Thus, the domain names 'aaa.ne.jp' and 'ccc.ne.jp' are stored in RAM 108 as information on inhibited destinations.

Then, JAM extracts from a URL a domain name described as a parameter of a GET method (FIG. 10:Step SC100). JAM reads the domain name stored in RAM 108 (Step SC110). JAM then determines whether the domain name extracted from the URL agrees with the domain name read from RAM 108 (Step SC120). In the present embodiment, the domain name 'aaa.ne.jp' of the URL included in the HTTP request generated by the Java-AP corresponds to the domain name 'aaa.ne.jp' stored in RAM 108 as a inhibited destination (Step SC120:YES). Thus, JAM cancels transmitting the HTTP request to provider's server apparatus PVS 500-1 by declining an establishment of a connection from the Java-AP to provider's server apparatus PVS 500-1 (Step SC 130).

Accordingly, communications from a Java-AP to the server apparatus assigned the domain name of the portal URL included in the selected profile data as well as communications from a Java-AP to the server apparatus assigned the domain name of the portal URL included in other profile data having the same access port ID as the access port ID included in the selected profile data are inhibited. Thus, communications from a Java-AP to another server apparatus connected to the same access port may also be inhibited, whereas such connections may not be inhibited in the embodiment in which only the connection from a Java-AP to the server apparatus assigned with the domain name of the portal URL included in each profile is prohibited. In the above example, communications from a Java-AP to a server apparatus, which is registered as a inhibited destination of, may also be inhibited, even when a user carrying mobile phone 100 switches to select profile data 2 from profile data 1 for example, B-2-5. Communication Performed by Java-AP (3)

Details will be described for a case that profile data 3 is selected.

Java-AP generates an HTTP request, and instructs JAM to transmit the generated HTTP request, in the same manner as described in the section 'Communication performed by Java-AP (1)'. Details of these operations will not be repeated here.

On receiving an instruction to transmit an HTTP request from a Java-AP, JAM reads from profile table TB3 an access point ID 'portal.bbb.ne.jp' of profile data 3 (FIG. 9:Step SB 100). JAM then reads from profile table TB3 a domain name 'bbb.ne.jp' of a portal URL of profile data 3 (Step SB110), stores in RAM 108 the read domain name (Step SB120).

Then, JAM confirms whether profile data including the same access point ID as the read access point ID is stored in profile table TB3 (Step SB130). In the present embodiment, the same access point ID as the read access point ID 'portal.bbb.ne.jp' is not stored included in profile table TB3 as illustrated in FIG. 6 (Step SB130:NO); JAM stores in RAM 108 only the domain name 'bbb.ne.jp' as information on the inhibited destinations of a communication.

Then, JAM extracts a domain name from a URL described as a parameter of a GET method. (FIG. 10:Step SC100). JAM reads the domain name stored in RAM 108 (Step SC120). JAM determines whether the domain name extracted from the URL corresponds to the domain name read from RAM 108 (Step SC110). In the present embodiment, the domain name 'aaa.ne.jp' of the URL included in the HTTP request generated by the Java-AP does not correspond to the domain name 'bbb.ne.jp' stored in RAM 108 as a inhibited destination.

(Step SC120:NO). Thus, JAM sets up a connection to provider's server apparatus PVS 500-3 via a second access point and gateway server apparatus GWS 400-3 on the basis of profile data 3, and transmits an HTTP request to provider's server apparatus PVS 500-3 (Step SC140).

On receiving the HTTP request, provider's server apparatus PVS 500-3 uses its proxy function to relay the received HTTP request. The HTTP request, relayed by provider's server apparatus PVS 500-3, is transmitted to provider's server apparatus PVS 500-1 via Internet 600.

Even in the present case, provider's server apparatus PVS 500-1 uses its firewall function to decline establishment of a connection to a provider's server apparatus in a case of receiving an HTTP request transmitted from a Java-AP via Internet 600. Thus provider's server apparatus PVS 500-1 does not communicate with a Java-AP programmed with illegal intentions.

C. Modification

C-1. Modification 1

Gateway server apparatus GWS 400 may double as provider's server apparatus PVS 500.

C-2. Modification 2

In establishing a connection with a provider's server apparatus, mobile phone 100 may establish the connection, first by transmitting an access point ID to GGSN 300 so as to determine an access point, and second by transmitting a GWIP to GGSN 300 so as to determine a gateway server apparatus GWS 400; then transmitting a domain name to GGSN 300.

C-3. Modification 3

Profile data stored in profile table TB3 may further include an IP address assigned to the server apparatus specified by a portal URL; the IP address may also be stored in RAM 108 when storing a domain name of a domain to which a connection is inhibited in RAM 108.

C-4. Modification 4

A connection to a particular site from application programs written in a programming language other than Java.

C-5. Modification 5

Mobile phone 100 may have an auxiliary registration function allowing a user of mobile phone 100 to add profile data to profile table TB3. According to this configuration, a new provider's server apparatus PVS 500, set-up after shipment of mobile phone 100, may be used as a portal site by addition of its profile data.

C-6. Modification 6

The software stored in ROM 107 of mobile phone 100 may be rewritable. For example, the software may be stored in a storage medium such as a Compact Disc Read Only Memory (CD-ROM). When the CD-ROM is inserted into the CD-ROM drive of a personal computer connecting to mobile phone 100 via a cable, the personal computer reads and transfers the software to mobile phone 100. Thus the software is installed in mobile phone 100. The storage medium may be a storage medium such as DVD-ROM, IC CARD including a flash ROM, or a flexible disk. Software may be downloaded from a server apparatus connected to the Internet and installed in mobile phone 100.

C-7. Modification 7

The inhibited destination of communication performed by a Java-AP may be generated in RAM 108 at a time other than when the Java-AP starts a communication. The inhibited destination may be generated either when a Java-AP is executed or when profile data is selected.

The information generated in RAM 108 about the inhibited destination of communications performed by a Java-AP may be deleted from RAM 108, when the execution of Java-AP is terminated.

C-8. Modification 8

A mobile communication network is not limited to a GSM/GPRS network. The mobile communication network may be another type of communication network offering a data communication service.

C-9. Modification 9

In a case that GGSN 300 has only one access point, SB 130 illustrated in FIG. 9 may be omitted. Domain names may be extracted from all the portal URLs stored in access point profile table TB3. Then, communications performed by a Java-AP to the provider's server apparatuses PVS 500 assigned to the extracted domain names may be inhibited.

C-10. Modification 10

OS software may provide functions of native applications such as Web browsing software, and functions of a Java execution environment software.

C-11. Modification 11

On receiving a request for communication, JAM may further request a native application, Web browsing software, for the communication. On receiving the request, the Web browsing software may terminate the communication.

C-12. Modification 12

Provider's server apparatus PVS 500 may store a text file written, for example, in accordance with c-HTML(compact HTML).

C-13. Modification 13

In starting to run Java-AP, Java execution environment software may start before executing a Java-AP.

The invention claimed is:

1. A communication terminal comprising:
a memory configured to store a plurality of profiles, each of the profiles including an identifier of a respective provider portal server and a corresponding identifier of a respective access point included in a network interconnection switch, the respective access point operable to communicate with other communication networks;
a display unit operable to receive a user input representative of selection of one of the profiles stored in the memory as a communication route for connection of the communication terminal to a first provider portal server that corresponds to the selected one of the profiles;
a downloaded application stored in the memory and executable to generate a transmittable request for information that includes a file location identified in the request; and
an application manager stored in the memory and executable to determine the first provider portal server that is associated with the identifier of a first access point of the selected one of the profiles, and to designate as inhibited sites each of the first provider portal server, and a second provider portal server identified with the application manager as being associated with the first access point in one of the profiles;
the application manager further executable, in response to receipt of the request, to allow transmission of the request only when the file location identified in the request is other than the inhibited sites.

2. The communication terminal of claim 1, wherein the identifier of the access point of the selected one of the profiles is also present in another one of the profiles that includes the first provider portal server.

3. The communication terminal of claim 1, wherein the downloaded application is executable absent an instruction from a user to generate the request.

4. The communication terminal of claim 1, wherein the memory comprises a non-volatile memory and a random access memory, the downloaded application and the profiles stored in the non-volatile memory, and the designation of the inhibited sites stored in the random access memory.

5. The communication terminal of claim 1, wherein the first provider portal server and the second provider portal server are each configured to set up a connection between the communication terminal and the Internet.

6. The communication terminal of claim 1, wherein the first provider portal server and the second provider portal server are each configured to selectively operate as a proxy server; an email server and an Internet server for the communication terminal.

7. The communication terminal of claim 1, wherein the transmittable request for information is a request for a file comprising user information that is accessible from the first provider portal server.

8. The communication terminal of claim 1, wherein the first access point connects a wireless network to the first provider portal server and the second provider portal server.

9. A method of controlling access with a communication terminal, the method comprising the steps of:
registering in a memory of a communication terminal a plurality of portal servers and a corresponding plurality of access points included in one or more network interconnection switches, wherein the access points are used to access the portal servers, and each access point is connected over a network to one or more portal servers;
selecting, from the registered portal servers, a first registered portal server to be used to initiate communication with a corresponding first access point; and
performing access control, when a request to access a portal server is generated by an application running in the communication terminal, the access control comprising:
denying access to the first registered portal server and a second registered portal server that is registered in the memory as sharing the first access point with the first registered portal server, when the portal server identified in the request is the first registered portal server; and
transmitting the request to the portal server identified in the request when the portal server identified in the request is not the first registered portal server and does not share an access point with the first registered portal server.

10. The method of claim 9, wherein selecting, from the registered portal servers, a first registered portal server further comprises identifying additional registered portal servers connected with the first access point of the first registered portal server, and storing an indication that the first registered portal server and any identified additional registered portal servers are inhibited destinations to the application.

11. The method of claim 10, wherein performing access control comprises comparing the stored indication of inhibited destinations with a destination included in the request.

12. The method of claim 9, wherein transmitting the request to the portal server comprises setting up a connection with the portal server.

13. The method of claim 9, wherein transmitting the request to the portal server comprises transmitting an HTTP request that includes a universal resource locator of the portal server.

14. The method of claim 9, comprising the initial step of downloading the application, and storing the application in the memory.

* * * * *